(12) United States Patent
Wilmot et al.

(10) Patent No.: US 9,545,895 B2
(45) Date of Patent: Jan. 17, 2017

(54) LOCKING MECHANISM FOR PEDESTRIAN HOOD LIFTERS

(71) Applicant: TK Holdings Inc., Auburn Hills, MI (US)

(72) Inventors: Larry M. Wilmot, Oxford, MI (US); Rachid Hammoud, Windsor (CA); Joshua D. Van Hooser, Waterford, MI (US); Steven R. Rehak, Rochester, MI (US); Jeremy M. Henck, White Lake, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/278,924

(22) Filed: May 15, 2014

(65) Prior Publication Data

US 2014/0339010 A1    Nov. 20, 2014

Related U.S. Application Data

(60) Provisional application No. 61/823,905, filed on May 15, 2013, provisional application No. 61/948,481, filed on Mar. 5, 2014.

(51) Int. Cl.
*B60R 21/38*  (2011.01)
*F15B 15/26*  (2006.01)
*F15B 15/19*  (2006.01)

(52) U.S. Cl.
CPC .............. *B60R 21/38* (2013.01); *F15B 15/261* (2013.01); *F15B 15/19* (2013.01)

(58) Field of Classification Search
CPC .......... B60R 21/38; B60R 21/34; B60R 21/00; B60R 21/0136; B60R 2021/0273; B62D 25/12; F15B 15/261

USPC .. 180/274, 69.2; 296/187.04, 193.11; 92/19, 18, 30, 26; 60/636, 632, 635; 188/300
See application file for complete search history.

(56) References Cited

U.S. PATENT DOCUMENTS

| | | | |
|---|---|---|---|
| 3,032,807 A | 5/1962 | Lanius | |
| 3,199,288 A | 8/1965 | Nahas | 60/26.1 |
| 4,309,027 A * | 1/1982 | Molders et al. | 267/124 |
| 6,520,276 B2 | 2/2003 | Sasaki | |
| 7,857,087 B2 | 12/2010 | Matsuura et al. | 180/274 |
| 7,946,376 B2 | 5/2011 | Hayashi et al. | 180/274 |
| 9,221,422 B2 | 12/2015 | Henck | |
| 2004/0211313 A1* | 10/2004 | Yamaguchi | 92/15 |

(Continued)

FOREIGN PATENT DOCUMENTS

| JP | 2003191818 | 7/2003 |
|---|---|---|
| JP | 2003191818 A * | 7/2003 |

(Continued)

OTHER PUBLICATIONS

Office Action, U.S. Appl. No. 14/278,578, filed May 15, 2014, Dated: Apr. 1, 2015.

*Primary Examiner* — Keith Frisby
(74) *Attorney, Agent, or Firm* — L.C. Begin & Associates, PLLC.

(57) ABSTRACT

A hood lifting mechanism includes a housing and a piston assembly movably mounted in the housing. The piston assembly has a groove formed therealong. A retainer is coupled to the housing so as to form a cavity therebetween. A locking member is positioned in the cavity so as to be engageable by the groove, for preventing motion of the piston assembly with respect to the housing.

18 Claims, 8 Drawing Sheets

(56) References Cited

U.S. PATENT DOCUMENTS

2005/0257980 A1 11/2005 Green et al.
2009/0223360 A1 9/2009 Aoki et al. .................. 92/15

FOREIGN PATENT DOCUMENTS

| JP | 2008056120 | | 8/2006 | |
| JP | 2008056120 A | * | 3/2008 | |
| JP | 2011208738 | | 10/2011 | ............. B60R 21/38 |

* cited by examiner

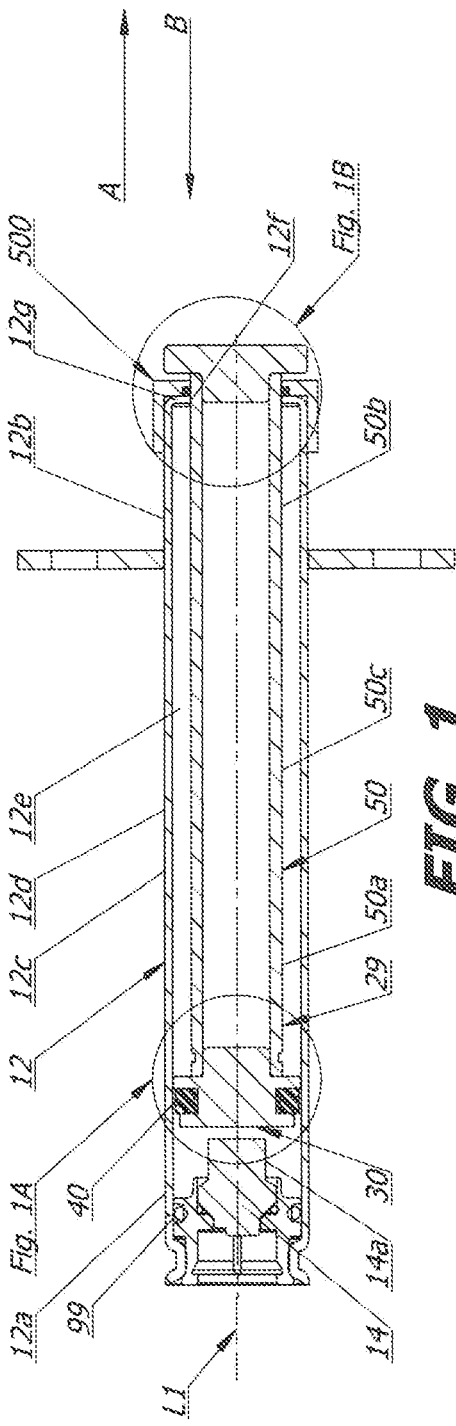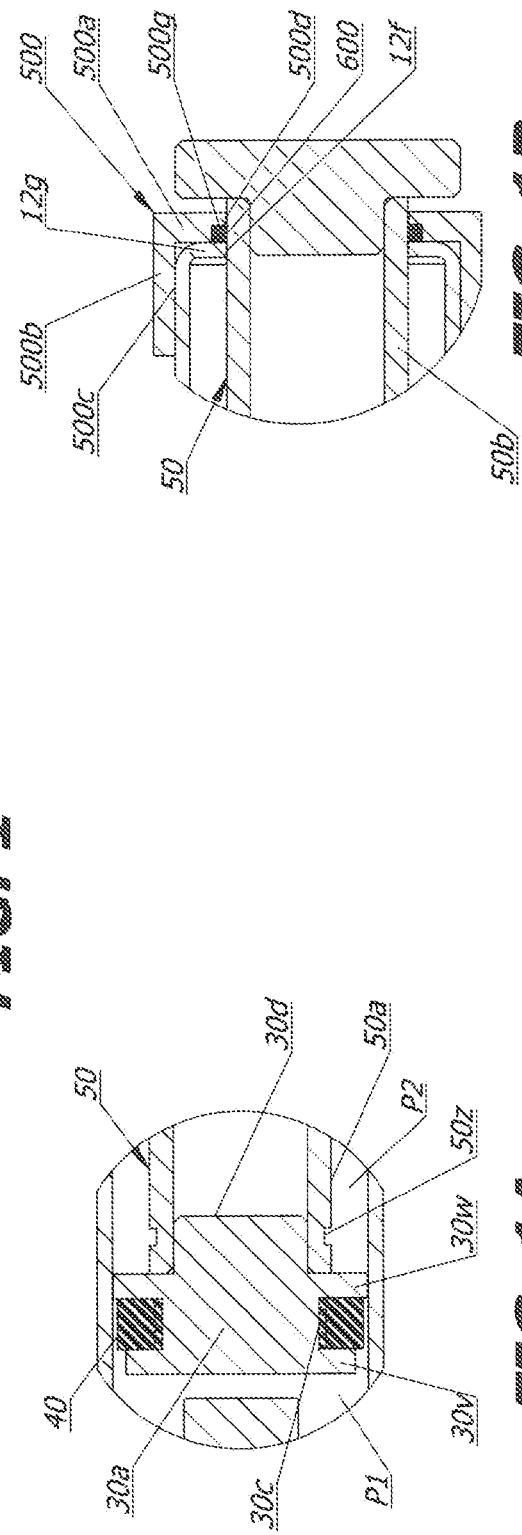

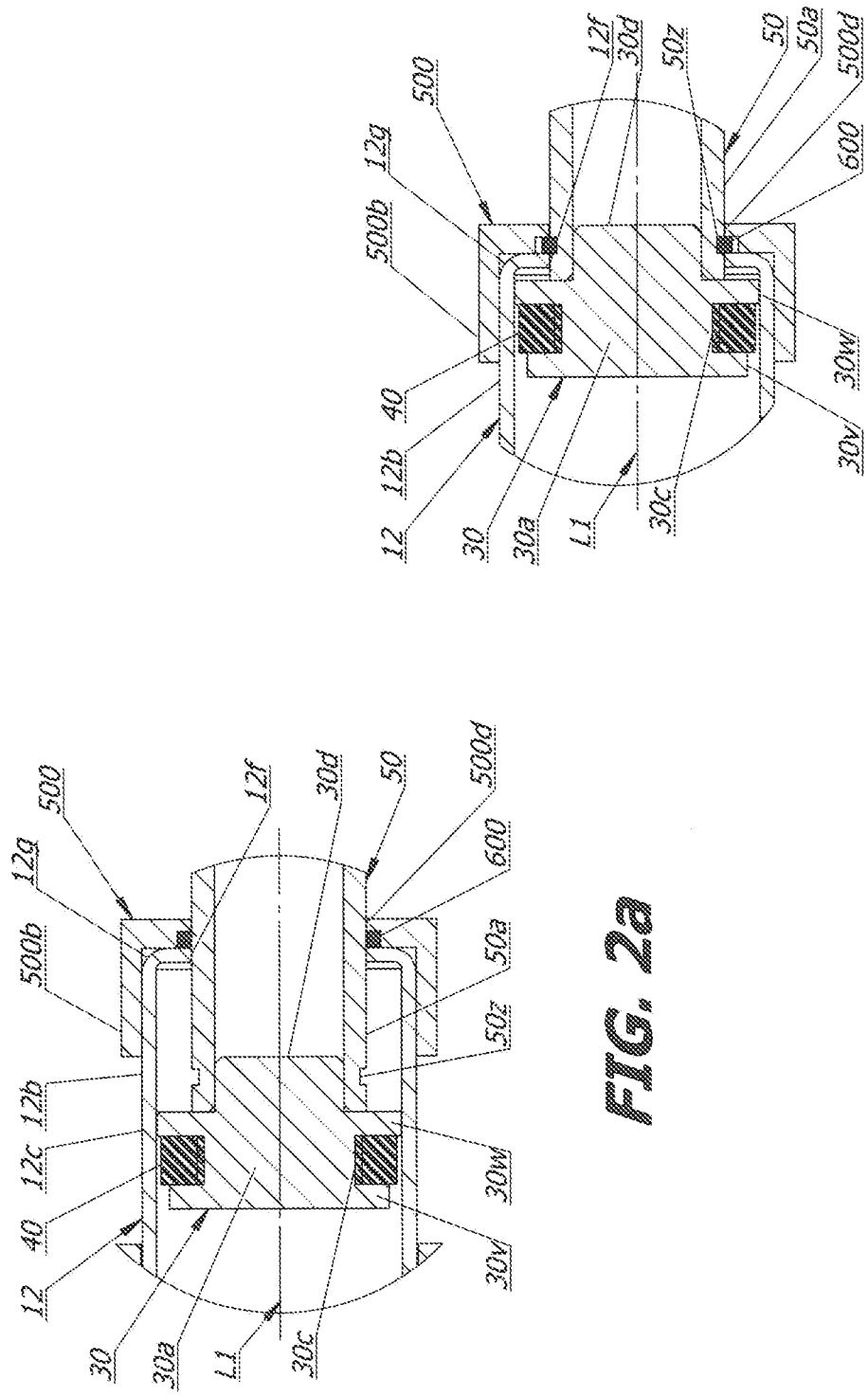

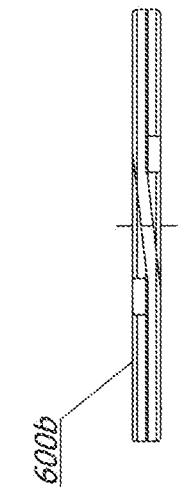
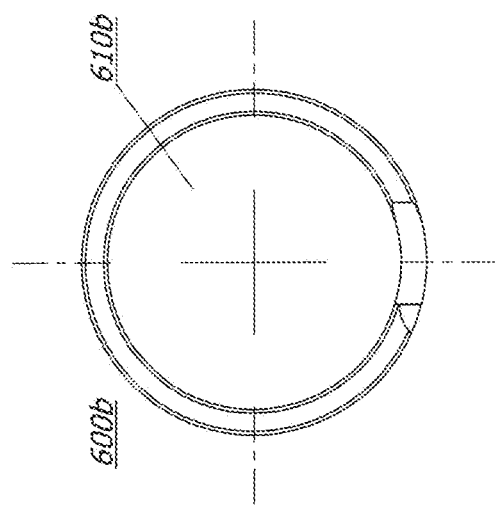
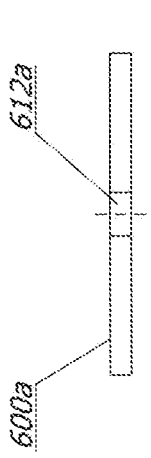
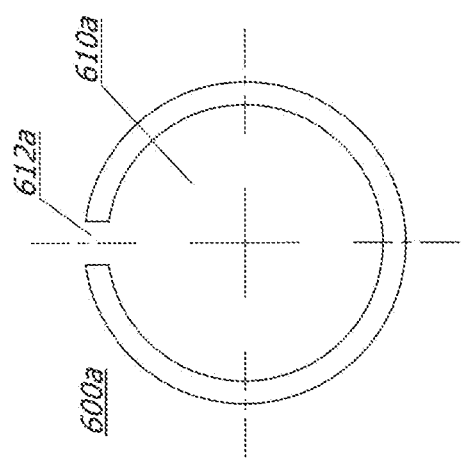

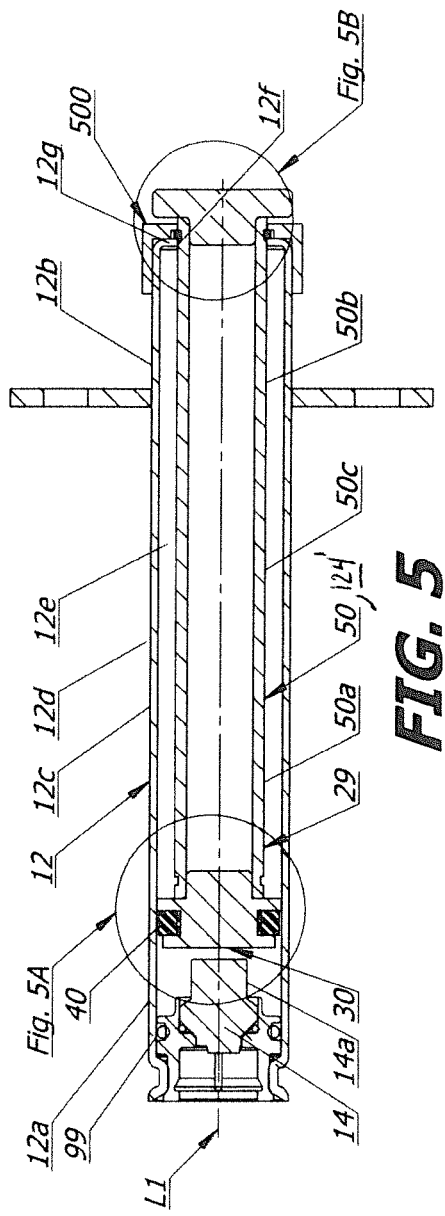
FIG. 5
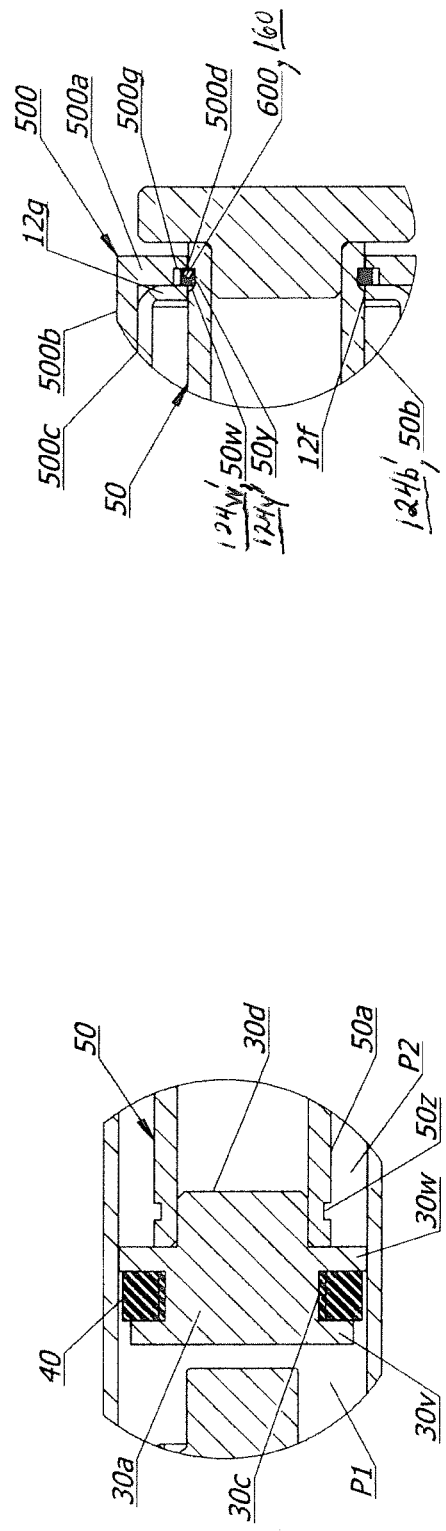
FIG. 5A
FIG. 5B

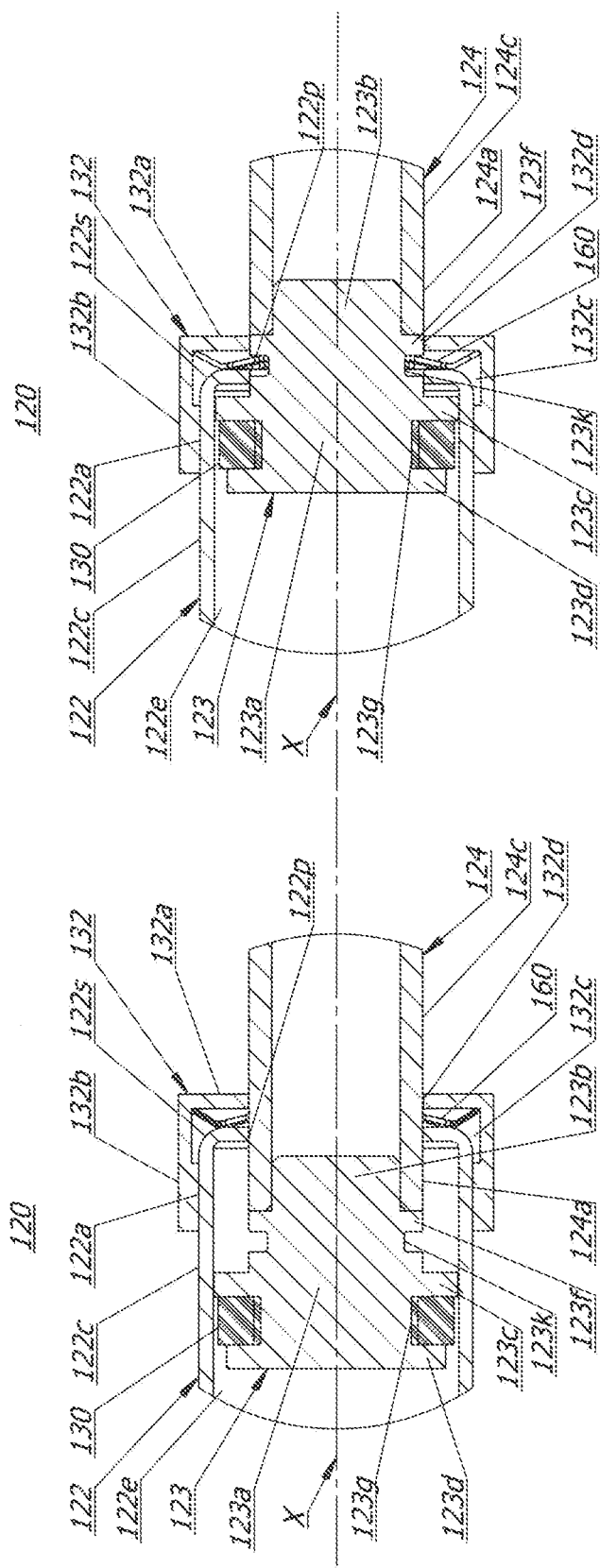

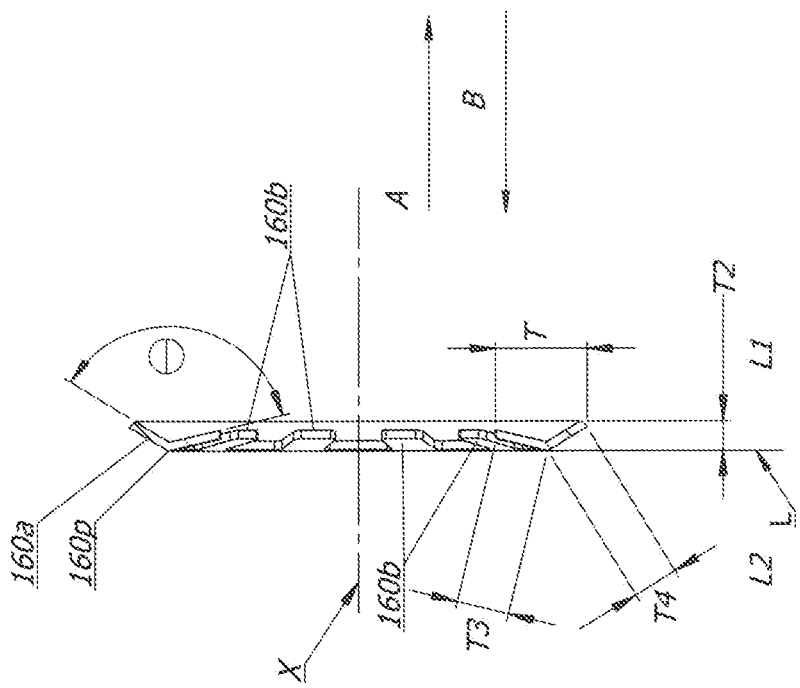
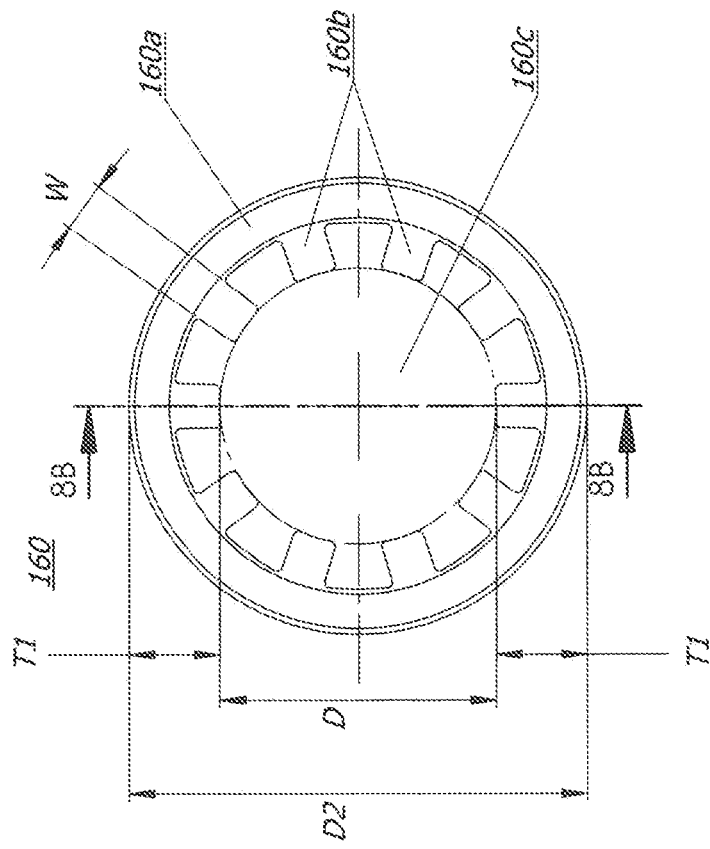
FIG. 8B
FIG. 8A

LOCKING MECHANISM FOR PEDESTRIAN HOOD LIFTERS

CROSS-REFERENCE TO RELATED APPLICATIONS

This application claims the benefit of U.S. Provisional Application Ser. Nos. 61/948,481, filed on Mar. 5, 2014, and 61/823,905, filed on May 15, 2013, the disclosures of which are incorporated herein by reference in their entireties.

BACKGROUND OF THE INVENTION

A hood lifting mechanism may be mounted on a motor vehicle for lifting a portion of a vehicle hood (for example, a rear portion of the hood proximate the windshield, or another portion of the hood) in a situation where the vehicle collides with a pedestrian. The mechanism may have a moving portion connected to the hood portion. Means (for example, a squib, a pneumatic line or other suitable mechanism) are provided for extending the moving portion to lift the hood portion connected thereto, upon actuation of the mechanism. When actuated, the mechanism raises the hood portion from its normal rest position and supports the hood portion in this elevated position. However, when the hood portion is raised, forces produced by an impact on the hood by a pedestrian may cause the moving portion of the hood lifting mechanism to retract. There is a need for a mechanism designed to maintain or help maintain the moving portion in its extended position, to prevent or retard this retraction. In addition, there is also a need for a mechanism to prevent the moving portion of the hood lifting mechanism from moving from its stowed or pre-activation position prior to activation of the hood lifting mechanism.

SUMMARY OF THE INVENTION

In one aspect of the embodiments described herein, a vehicle hood lifting mechanism is provided. The mechanism includes a housing and a piston assembly movably mounted in the housing. The piston assembly has a groove formed therealong. A retainer is coupled to the housing so as to form a cavity therebetween. A locking member is positioned in the cavity so as to be engageable by the groove, for preventing motion of the piston assembly with respect to the housing.

In another aspect of the embodiments of the described herein, a vehicle hood lifting mechanism is provided. The mechanism includes a housing and a piston assembly movably mounted in the housing so as to be extendible from the housing. Locking means are provided for engaging the piston assembly exterior of the housing to prevent movement of the piston assembly with respect to the housing.

In another aspect of the embodiments of the described herein, a hood lifting mechanism is provided. The mechanism includes a housing and a piston assembly movably mounted in the housing so as to be extendible from the housing. The piston assembly has an outer surface and a groove extending into a portion of the outer surface. An elastically deformable member is operatively coupled to the housing. The member is structured to slidably engage the outer surface. The member is also structured to engage the groove so as to impede motion of the piston assembly with respect to the member.

BRIEF DESCRIPTION OF THE DRAWINGS

FIG. 1 is a cross-sectional side view of a hood lifting mechanism incorporating a locking mechanism in accordance with an embodiment described herein.

FIG. 1A is a magnified cross-sectional side view of a piston and first end of a piston rod of the piston assembly shown in FIG. 1, with the piston assembly in a fully retracted condition prior to activation.

FIG. 1B is a magnified cross-sectional side view of an end of a housing and a second end of a piston rod of the hood lifting mechanism shown in FIG. 1.

FIG. 2A is a magnified cross-sectional side view of a portion of the piston and first piston rod end of FIG. 1A, after activation of the hood lifting mechanism and prior to the piston rod reaching its full stroke.

FIG. 2B is a magnified cross-sectional side view of the portion of the hood lifting mechanism shown in FIG. 2A, after the piston rod reaching its full stroke or full extension.

FIG. 3A is a front view of a first embodiment of a locking member incorporated into a locking mechanism in accordance with an embodiment described herein.

FIG. 3B is a side view of the locking member embodiment shown in FIG. 3A.

FIG. 4A is a front view of a second embodiment of a locking member incorporated into a locking mechanism in accordance with an embodiment described herein.

FIG. 4B is a side view of the locking member embodiment shown in FIG. 4A.

FIG. 5 is a cross-sectional side view of a hood lifting mechanism incorporating a locking mechanism in accordance with another embodiment described herein.

FIG. 5A is a magnified cross-sectional side view of a piston and first end of a piston rod of the piston assembly shown in FIG. 5, with the piston assembly in a fully retracted condition prior to activation.

FIG. 5B is a magnified cross-sectional side view of an end of a housing and a second end of a piston rod of the hood lifting mechanism shown in FIG. 5.

FIG. 7A is a magnified cross-sectional side view of a portion of the hood lifting mechanism shown in FIG. 6, after activation of the mechanism and prior to a piston of the mechanism reaching its full stroke.

FIG. 7B is a cross-sectional side view of the portion of the hood lifting mechanism shown in FIG. 7A, after activation of the mechanism and after the piston reaching its full stroke.

FIG. 8A is a front view of one embodiment of a locking member usable in the locking mechanism embodiment shown in FIGS. 6-7B.

FIG. 8B is a cross-sectional side view of the locking member shown in FIG. 8A.

DETAILED DESCRIPTION

Figure 6:
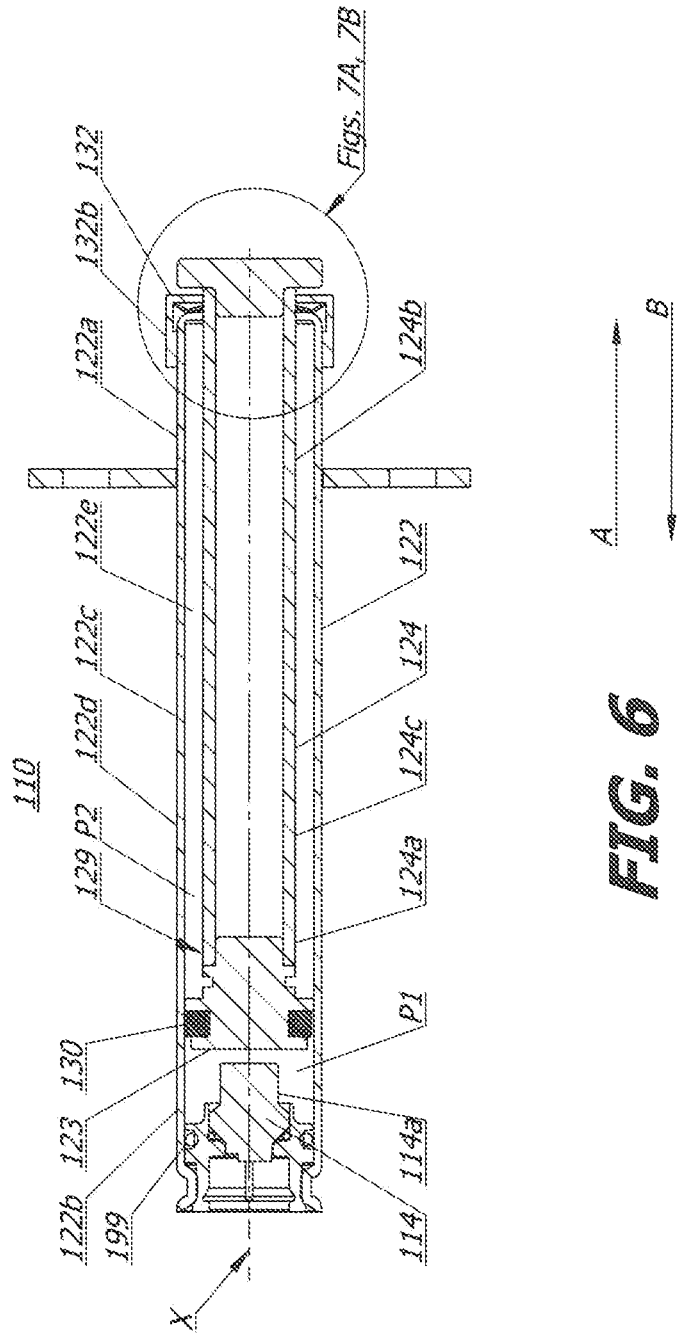
FIG. 6 is a cross-sectional side view of a hood lifting mechanism incorporating a locking mechanism in accordance with another embodiment described herein.

Like reference numerals refer to like parts throughout the description of several views of the drawings. In addition, while target values are recited for the dimensions of the various features described herein, it is understood that these values may vary slightly due to such factors as manufacturing tolerances, and also that such variations are within the contemplated scope of the embodiments described herein.

FIGS. 1-2B show cross-sectional views of a pressurized gas-powered actuator 10 incorporating a locking mechanism for a hood lifting device in accordance with an embodiment described herein. In FIGS. 1-2B, the actuator is shown with its piston assembly in a fully retracted condition prior to activation. The piston assembly is in a fully retracted condition when it is at the end of the stroke residing within the housing. The piston assembly is in a fully extended condition when the piston rod has reached its maximum extension from an end of the housing.

The actuator 10 may be mounted to any suitable device or mechanism, if desired, and may be operatively coupled (via piston rod 50, described in greater detail, below) to the device or mechanism for transmitting a force to the device or mechanism. The actuation force is generated responsive to the introduction of a pressurized gas into a housing of the actuator, in a manner described below. The pressurized gas may be generated within the housing (for example, by a gas generator incorporated into the housing), or the gas may be introduced into the housing from an external gas source in fluid communication with the housing interior. As described herein, one possible application for an actuator as described herein is in lifting a portion of a hood of an automotive vehicle.

In the embodiments disclosed herein, actuator 10 has a housing 12 and a piston assembly 29 movably positioned within the housing. Housing 12 has an outermost housing wall 12d defining a first end 12a, a second end 12b, and a body 12c connecting the first and second ends. A longitudinal central axis L1 extends through the housing 12. Wall 12d also defines a hollow interior 12e of the housing. In the embodiment shown in FIG. 1, housing first end 12a is configured to accommodate a suitable gas generator 14 (for example, a known micro-gas generator) to be inserted and retained therein by crimping, adhesive attachment, or any other suitable method. Alternatively, the gas generator 14 or a portion thereof may be attached to an exterior of housing first end using a suitable retention method. A gas-emitting portion 14a of the gas generator 14 is positioned within the housing so that generated gases flow into the housing interior after activation of the gas generator. If desired, a suitable seal 99 (such as an epoxy seal, o-ring seal or other sealing means) may be provided to prevent or minimize leakage of generated gas between the gas generator 14 and the housing 12 to an exterior of the housing.

In the embodiment shown in FIGS. 1-2B, housing second end 12b has an opening 12f structured to receive therethrough a piston rod 50 attached to a piston 30 of the piston assembly 29, which is slidably positioned in the housing interior. Opening 12f may be sized or otherwise structured to laterally constrain or support the piston rod 50 as portions of the rod move into and out of the housing through opening 12f. In the particular embodiment shown in FIGS. 1-2B, an end wall 12g is formed from a portion of housing 12, and opening 12f is drilled or otherwise formed in the wall 12g. Housing 12 may be formed from a metallic material or any other suitable material or materials.

In the embodiments shown herein, piston assembly 29 includes a piston 30 slidably positioned within the housing, and a piston rod 50 attached to the piston so as to move in conjunction with the piston. The piston assembly may also include any elements coupled to one or both of the piston rod and the piston, so as to move in conjunction with the piston rod and piston. In a manner known in the art, activation of the pressurized gas source 14 results in the production of compressed gas, which propels the piston assembly 29 in an extension direction of the piston rod (direction "A" in the drawings).

Piston 30 is slidably positioned within housing interior 12e. Piston 30 has a base 30a and a first flange 30w projecting from the base 30a. A second flange 30v projects from the body portion at a location spaced apart from first flange 30w. Flange 30w forms a close sliding fit with the inner surface of body 12c to aid in preventing escape of pressurized fluid from inside the housing. Base 30a and flanges 30w and 30v define therebetween a cavity or groove 30c structured for receiving therein an o-ring or other resilient seal, generally designated 40.

In a known manner, seal 40 resiliently slidingly contacts the interior surfaces of housing wall 12d, thereby providing a substantially gas-tight seal between the piston 30 and the interior surfaces of housing wall 12d to aid in preventing escape of pressurized fluid from inside the housing. When piston 30 is positioned in housing 12 with seal 40 contacting the housing wall interior surfaces, the region of contact between the seal 40 and the housing wall defines a boundary between a higher pressure side P1 of the piston and a lower pressure side P2 of the piston.

In the embodiments shown herein, a projection 30d extends from piston base 30a. Projection 30d is structured for engaging (or for suitable attachment to) an associated piston rod 50 in an interference fit, or for otherwise enabling or facilitating attachment of the piston rod 50 to the piston 30. To help ensure that the piston rod 50 remains attached to the piston 30 during operation of the hood lifting mechanism, piston rod 50 may also (or alternatively) be attached to piston 30 by welding, adhesive attachment, or any other suitable method. Alternatively, the piston 30 and piston rod 50 may be formed integrally together, as a single piece, for example, by casting, molding, or any other suitable method.

One or more retention features on the piston 30 are designed to engage complementary features on housing 12 to limit the travel or stroke of the piston rod during actuation, and to retain the piston in the housing. In the embodiments shown herein, this retention function is performed by first flange 30w abutting housing end wall 12g when the piston assembly 29 is at full stroke, as described herein. However, any of a variety of other retention features or mechanisms may also be utilized. Piston 30 may be formed from a metallic material or any other suitable material or materials.

Piston rod 50 is the mechanism through which the actuator force is transmitted to an element (for example, a portion of a hood of a vehicle (not shown)) connected to the piston rod. Piston rod 50 is attached to piston 30 so as to move in conjunction or correspondence with the piston. In the embodiment shown in FIGS. 1-2B, piston rod 50 is formed from a hollow tubular member having a first end 50a, a second end 50b opposite first end 50a, and a wall 50c connecting the first and second ends. First end 50a is structured for attachment to the piston 30 so as to move in conjunction with the piston. Second end 50b may be configured for attachment to an element or mechanism to which the actuator force is to be transmitted. Piston rod 50 may alternatively be formed from a solid rod or bar with a cavity formed therein for engaging piston end projection 30d in a manner described herein. Alternatively, piston rod 50 may be formed from a solid rod or bar, and a complementary cavity (not shown) may be formed in piston 30 for receiving piston rod first end 50a therein. The connection between piston 30 and piston rod 50 may also be formed using a threaded connection between the parts or using any other mechanism suitable for the purposes described herein. The piston rod may also have any particular length, diameter, shape and/or other characteristic(s) suitable or necessary for a particular application. Piston rod 50 may be formed from a metallic material or any other suitable material or materials.

The hood-lifting mechanism embodiments described herein incorporate various locking mechanisms for impeding motion of the piston rod in a piston rod retraction direction (direction "B" in the drawings) opposite the extension direction (direction "A"), after the piston rod has reached full extension from the housing. Certain embodiments described herein may also incorporate a locking mechanism for impeding motion of the piston rod in the piston rod extension direction prior to activation.

In the embodiments described herein, a locking member retainer 500 is positioned along an exterior of the housing. The retainer is structured to form, in conjunction with the housing, a cavity for positioning of a locking member (described below) therein. In the embodiments shown, the retainer is in the form of an end cap attached to an end of housing 12 by welding or any other suitable method. However, the retainer may have any alternative configuration suitable for the requirements of a particular application.

Referring to FIGS. 1-2B and 5-5B, in particular embodiments, retainer 500 is secured to housing end 12b and/or to housing wall 12d by welding or any other suitable means. Retainer 500 may serve to reinforce or strengthen the housing end wall 12g against impact forces exerted by the piston 30 contacting the end wall at the end of the piston stroke (i.e., at full stroke).

In the embodiment shown, locking member retainer 500 has a base portion 500a and a wall 500b extending from a periphery of the base portion to define an interior cavity 500c structured for receiving housing end 12b therein. Base portion 500a has a central opening 500d formed therein. Opening 500d is coaxial with (or is otherwise aligned with) opening 12f in housing 12 to enable piston rod 50 to extend through the opening. Opening 500d is sized to provide a clearance between the piston rod and the opening, or to permit the piston rod to slide along the edge of the opening during movement of the piston rod. Retainer 500 may be formed from a metallic material or any other suitable material or materials.

FIGS. 1-2B show a hood-lifting mechanism incorporating a locking mechanism for impeding motion in the piston rod retraction direction (direction "B" in the drawings). FIG. 2B is a magnified cross-sectional view of the portion of an assembly shown in FIGS. 1B and 2A, showing the second end 12b of housing 12 when the piston 30 has traveled its maximum distance within the housing after actuation and piston rod 50 has reached the end of its stroke. In applications of the actuator where it is desirable that the piston rod 50 be locked in this final position when the end of the stroke is reached, a groove 50z may be formed along an exterior surface of piston rod 50 proximate piston 30. Groove 50z is sized for receiving therein a portion of a locking member, as described below. In addition, a shoulder 500g may be formed to extend along and surround the retainer opening 500d. Shoulder 500g may be, for example, formed as a counterbore in retainer base portion 500a from interior 500c. Shoulder 500g defines a cavity in the retainer which serves as a receptacle for a locking member, generally designated 600. Shoulder 500g and locking member 600 are dimensioned with respect to each other so as to enable radial expansion and contraction of the locking member 600 within the cavity responsive to contact between the locking member and the piston rod 50, while still retaining the locking member within the cavity.

FIGS. 3A-4B show two embodiments of locking member 600. Referring to FIGS. 3A-4B, locking members 600a and 600b define respective central openings 610a and 610b, respectively. Openings 610a and 610b are structured to permit insertion of the piston rod 50 into the opening, and to permit sliding of the piston rod through the opening and with respect to the locking member as the rod extends from the housing during actuator operation. The locking member openings 610a and 610b are also sized so as to have a diameter smaller than the outer diameter of the piston rod prior to insertion of the piston rod into the opening, so that the locking member expands slightly when the piston rod is inserted into the opening. Locking members 600a and 600b are also structured to be resiliently deflectable or expandable in radially inward and outward directions, responsive to insertion of the piston rod into the opening.

Referring to FIGS. 3A and 3B, in one the embodiment locking member 600a is in the form of a "C" clip having a gap 612a formed therein. Referring to FIGS. 4A and 4B, in another embodiment locking member 600b is in the form of a relatively flat, ring-shaped spiral-wound spring member. One ring design suitable for the purposes described herein is in the form of SPIROLOX Retaining Rings, sold by Steel Ring Company of Lake Zurich, Ill. However, spring members suitable for the purposes described herein may also be obtained from other sources. Also, in addition to the embodiments shown in FIGS. 3A-4B, locking member 600 may have any of a variety of other forms structured to perform the functions described herein.

Referring to FIGS. 5-5B, in another embodiment of the hood lifting mechanism, an additional groove 50y may be formed in piston rod 50 at or proximate the rod second end 50b. This groove 50y is located so as to align with retainer shoulder 500g as shown, prior to activation of the actuator. Groove 50y and shoulder 500g are structured to receive therein portions of an embodiment of a locking member 600 as previously described. In this embodiment, any attempt to move the piston rod in piston rod extension direction "A" prior to actuator activation will press the locking member 600 against shoulder 500g. Thus, axial motion of the piston rod prior to actuator activation is prevented, and the piston rod 50 is "locked" in the pre-activation position. This prevents the piston rod from extending from the housing due to, for example, the action of gravity on the piston assembly or an increase in pressure on piston side P1 due to elevated temperatures.

If desired, a wall of piston rod groove 50y closest to the gas generator 14 may include a sloped surface or ramp 50w formed into or along a side thereof. This provides an inclined surface or ramp to assist the locking member 600 in "climbing out" of the groove 50y as the piston rod moves in direction "A" after the hood lifting mechanism is activated. The dimensions of the surface 50w may be adjusted to tailor the amount of force needed to force the locking member along surface 50w and onto the exterior surface of the piston rod. Thus, the piston rod is maintained in the fully retracted condition shown in FIG. 5 until activation of the hood lifter.

The receptacle for the locking member 600 may alternatively be in the form of a groove formed into central opening 500d, spaced apart from a portion of retaining member base 500a in contact with end wall 12g. Also, the ring/groove/piston rod interface dimensions, material properties, and the number of mating grooves, shoulders and retaining rings can be adjusted by one skilled in the art to achieve various levels of resistance to axial movement of the piston rod. For example, in other embodiments, multiple grooves and/or shoulders may be formed in the retainer and/or in an outer surface of end wall 12g, with each groove or shoulder receiving an associated retaining ring therein.

In an alternative embodiment, the groove 50y is formed in the piston 30 rather than in the piston rod.

In another alternative embodiment, the groove 50y proximate piston second end 50b is formed in the piston as previously described, while the groove 50z is omitted.

When the retainer 500 is positioned on housing end 112b as shown in FIGS. 1-2B and 5-5B, the locking member 600 is secured and retained between the retainer 500 and housing end wall 12g prior to locking mechanism activation, in a pocket or cavity formed by shoulder 500g and end wall 12g.

As the piston rod 50 extends from the housing 12 after actuator activation, the piston rod slides along the interior of the locking member 600. During this sliding engagement, because the locking member has been radially outwardly "stretched" by insertion of the piston rod therein, the locking member provides some frictional resistance to axial movement of the piston rod. The piston rod overcomes this frictional resistance, allowing the rod to move from its initial pre-deployed position (FIGS. 1 and 1A), to the fully deployed position shown in FIG. 2B. As the piston rod 50 reaches full stroke, piston rod groove 50z comes into alignment with shoulder 500g. This permits the resiliently expanded locking member to radially contract and extend partially into the piston rod groove 50z. The locking member also still extends partially into the cavity formed by shoulder 500g and end wall 12g, so as to abut the shoulder and the end wall. Thus, in this condition, any attempt to further move the piston rod axially will press or squeeze the locking member between a wall of groove 50z and housing end wall 12g. Thus, further axial motion of the piston rod in direction "B" is prevented, and the piston rod 50 is "locked" in the full stroke position.

The stroke length can be controlled by adjusting the length of the piston rod incorporated into the assembly. This enables the use of the same hood-lifting mechanism components (aside from the piston rod) for a variety of different stroke lengths.

FIGS. 6-7B show cross-sectional side views of a hood-lifting mechanism 110 in the form of a pressurized gas-powered actuator incorporating a locking mechanism in accordance with another embodiment described herein. In FIG. 6, the actuator is shown a condition prior to activation.

The actuator 110 may be mounted to any suitable device or mechanism (for example, a portion of a vehicle hood), if desired, and may be operatively coupled (via piston rod 124, described in greater detail, below) to the device or mechanism for transmitting a force to the device or mechanism. The actuation force is generated responsive to the introduction of a pressurized gas into a housing of the actuator, in a manner described below. The pressurized gas may be generated within the housing (for example, by a gas generator incorporated into the housing), or the gas may be introduced into the housing from an external gas source in fluid communication with the housing interior. As described herein, one possible application for an actuator as described herein is in lifting a portion of a hood of an automotive vehicle.

In the embodiments shown in FIGS. 6-8B, actuator 110 has a housing 122 and a piston assembly 129 movably positioned within the housing. Housing 122 has an outermost housing wall 122d defining a first end 122a, a second end 122b, and a body 122c connecting the first and second ends. A longitudinal central axis X extends through the housing 122. Wall 122d also defines a hollow interior 122e of the housing. In the embodiment shown in FIG. 6, housing second end 122b is configured to accommodate a suitable gas generator 114 (for example, a known micro-gas generator) to be inserted and retained therein by crimping, adhesive attachment, or any other suitable method. Alternatively, the gas generator 114 or a portion thereof may be attached to an exterior of housing first end using a suitable retention method. A gas-emitting portion 114a of the gas generator 114 is positioned within the housing so that generated gases flow into the housing interior after activation of the gas generator. If desired, a suitable seal 199 (such as an epoxy seal, o-ring seal or other sealing means) may be provided to prevent or minimize leakage of generated gas between the gas generator 114 and the housing 122 to an exterior of the housing. Housing 122 may be formed from a metallic material or any other suitable material or materials.

In the embodiments shown in FIGS. 6-7B, piston assembly 129 includes a piston 123 slidably positioned within the housing, and a piston rod 124 attached to the piston so as to move in conjunction with the piston. In a manner known in the art, activation of the pressurized gas source 114 results in the production of compressed gas, which propels the piston assembly 129 in direction "A".

In FIGS. 6-8B, piston 123 and piston rod 124 travel along axis X during movement of the piston and piston rod within the housing. The hood lifting mechanism is structured so that piston 123 and the associated piston rod 124 move in a piston rod deployment or extension direction (direction "A" in the drawings). The mechanism also incorporates a locking mechanism as described herein for impeding motion of the piston rod in a piston rod retraction direction (direction "B" in the drawings) opposite the extension direction. The mechanism may also incorporate a locking mechanism as described herein for impeding motion of the piston rod in a piston rod extension direction (direction "A" in the drawings) opposite the retraction direction.

FIG. 7A shows the piston 123 and a portion of the piston rod 124 of FIG. 6 after activation of the hood lifting mechanism to lift a portion of a vehicle hood (not shown), but prior to a time when a full stroke of the piston rod has been achieved (i.e., prior to a time when the piston 123 has reached the full extent of its travel within the housing 122). FIG. 7b shows the piston 123 after is has reached the full extent of its travel within the housing 22.

One or more retention features on the housing 122 are designed to engage complementary features on the piston 123 to limit the travel or stroke of the piston rod during actuation, and to retain the piston in the housing. In the embodiment shown in FIGS. 7A and 7B, a portion of housing first end 122a is formed so as to define a shoulder or end wall 122s including an opening 122p at the end of the housing through which piston rod 124 extends. Opening 122p may be drilled or otherwise formed in the shoulder 122s. Opening 122p may be sized or otherwise structured to laterally constrain or support the piston rod 124 as portions of the rod move into and out of the housing through opening 122p. Piston 123 may abut shoulder 122s when the piston reaches the end of its travel within housing 122.

Referring to FIGS. 6-8B, piston 123 has a body portion 123a, an end projection 123b extending from the body portion, a first flange 123c projecting from the body portion adjacent the end projection, and a second flange 123d projecting from the body portion at a location spaced apart from first flange 123c. Flange 123c forms a close sliding fit with inner surfaces of housing body 122c to aid in preventing escape of pressurized fluid from inside the housing.

Body portion 123a and flanges 123c and 123d define therebetween a cavity or groove 123g structured for receiving therein an o-ring or other resilient seal, generally designated 130. In a known manner, seal 130 resiliently slidingly contacts the interior surfaces of housing wall 122d to aid in preventing escape or leakage of pressurized fluid past piston 123 during motion of piston 123 within housing 122.

When piston 123 is positioned in housing 122 with seal 130 contacting the housing wall interior surfaces, the region of contact between the seal and the housing wall defines a boundary between a higher pressure side P1 of the piston and a lower pressure side P2 of the piston.

End projection 123b is sized to engage wall 124c of a piston rod 124 in an interference fit, or for otherwise enabling or facilitating attachment of the piston rod 124 to the piston 123. Alternatively, to help ensure that the piston rod 124 remains attached to the piston 123 during operation of the hood lifting mechanism, piston rod 124 may be attached to piston 123 by welding, adhesive attachment, or any other suitable method. Alternatively, the piston 123 and piston rod 124 may be formed integrally together, as a single piece, for example, by casting, molding, or any other suitable method.

One or more retention features on the piston 123 are designed to engage complementary features on housing 122 to limit the travel or stroke of the piston rod during actuation, and to retain the piston in the housing. In the embodiment shown in FIGS. 7A and 7B, this retention function is performed by first flange 123c abutting housing end wall 122s when the piston 123 is at full stroke, as described herein. However, any of a variety of other retention features or mechanisms may also be utilized. Piston 123 may be formed from a metallic material or any other suitable material or materials.

In the embodiment shown in FIGS. 7A and 7B, an additional flange portion 123f is provided adjacent end projection 123b. Flange portion 123f is abutted by an end 124a of piston rod 124 and secured thereto. Flange 123f has an outer diameter greater than the diameter D of the opening 160c extending through the retaining member interior when the tabs 160b are in an undeflected state. In the embodiment shown, flange 123f has an outer diameter equal to that of piston rod 124. In addition, another groove 123k is provided between flange 123f and flange 123c. Groove 123k as described herein may be formed in either the piston 123 or in the piston rod 124.

Piston rod 124 is the mechanism through which the actuator force is transmitted to an element (for example, a portion of a hood of a vehicle (not shown)) connected to the piston rod. Piston rod 124 is attached to piston 123 so as to move in conjunction or correspondence with the piston. In the embodiment shown in FIGS. 6-7B, piston rod 124 is formed from a hollow tubular member having a first end 124a, a second end 124b, and a wall 124c connecting the first and second ends. Alternatively, piston rod 124 may be formed from a solid rod or bar with a cavity formed therein for engaging piston end projection 123b in a manner described herein. Alternatively, piston rod 124 may be formed from a solid rod or bar, and a complementary cavity (not shown) formed in piston 123 for receiving end 124a of the piston rod therein. The connection between piston 123 and piston rod 124 may also be formed using a threaded connection between the parts or using any other mechanism suitable for the purposes described herein. The piston rod may also have any particular length, diameter, shape and/or other characteristic(s) suitable or necessary for a particular application. Piston rod 124 may be formed from a metallic material or any other suitable material or materials. Alternatively, the piston 123 and piston rod 124 may be formed integrally together, as a single piece, for example, by casting, molding, or any other suitable method.

In the embodiments shown in FIGS. 6-8B, a locking member retainer 132 is positioned along an exterior of the housing. The retainer is structured to form, in conjunction with the housing, a cavity for positioning of a locking member (described below) therein. In the embodiments shown, the retainer is in the form of a collar attached to an end of housing 122 by welding or any other suitable method. However, the retainer may have any alternative configuration suitable for the requirements of a particular application.

Retainer 132 may serve to reinforce or strengthen the housing end wall 122s against impact forces exerted by the piston 123 contacting the end wall at the end of the piston stroke (i.e., at full stroke). In the embodiment shown in FIGS. 7A and 7B, retainer 132 has a base portion 132a and a wall 132b extending in a first direction from an edge of the base portion to define a cavity 132c structured for receiving therein a portion of housing first end 122a. Cavity 132c is also structured for receiving and containing therein a locking member 160 (described in greater detail below). Retainer base portion 132a also has an opening 132d formed therein. Opening 132d is coaxial with (or is otherwise aligned with) opening 122p in housing 122 to enable piston rod 124 to extend through the opening. Opening 132d is sized to provide a clearance between the piston rod 124 and edges of the opening, or to otherwise permit the piston rod to slide along the edge of the opening during movement of the piston rod. Retainer 132 may be formed from a metallic material or any other suitable material or materials.

As stated previously, the hood-lifting mechanism embodiments described herein incorporate various mechanisms for impeding motion of the piston rod in a piston rod retraction direction (direction "B" in the drawings) opposite the extension direction, after the piston rod has reached full extension from the housing. The mechanism may also incorporate a locking mechanism for impeding motion of the piston rod in a piston rod extension direction (direction "A" in the drawings) opposite the retraction direction.

FIGS. 6-7B show a hood-lifting mechanism incorporating a locking mechanism for impeding motion in the piston rod retraction direction (direction "B" in the drawings). In the embodiment shown in FIGS. 6-7B, a locking member 160 is positioned in cavity 132c and is structured to lockingly engage the piston rod 124 when a force in direction "B" is applied to the piston rod. In the embodiment shown, locking member 160 is in the form of a ring having a continuous, circular outer portion 160a and a plurality of tabs 160b extending generally radially inwardly from the outer portion. Alternatively, locking member 160 may have any of a variety of other suitable shapes, depending on the needs of a particular application.

Referring to FIG. 6, prior to activation of the hood lifting mechanism, piston rod 124 extends through opening 160c and deflects tabs 160b in direction "A". Referring to FIGS. 8A and 8B, in the embodiment shown, tabs 160b have equal lengths T1 and combine to define a diameter or extent D of an opening 160c extending through the locking member interior. When the locking member 160 is separate from the hood lifting mechanism and is in an undeflected condition, a radial distance T from a radially outermost edge of the locking member to the end of a tab 160b is equal to one half of the difference between the outermost diameter D2 of locking member 160 and the diameter D of the opening 160c extending through the locking member. Lengths T1 are dimensioned such that diameter D is slightly smaller than an outer diameter of piston rod 124. Thus, insertion of the piston rod into the opening 160c defined by the ends of tabs 160b causes a deflection of the tab ends, in the direction in which the piston rod is inserted into the opening 160c. For example, if the piston rod 124 is inserted into opening 160c in direction "A", tabs are also deflected in direction "A".

In the embodiment shown in FIGS. 8A and 8B, tabs 160*b* extend from outer portion 160*a* with a slight bias in direction "A". In this embodiment, direction "A" is the direction in which piston rod 124 moves within the housing and exits the housing to lift the hood after activation of the mechanism. In addition, outer portion 160*a* similarly extends in direction "A" from the intersections formed between the outer portion and the tabs. In this embodiment, a locking member apex 160*p* is defined by portions of the ring residing along a plane L, along which the tabs 160*b* intersect the outer portion 160*a*. Elements of locking member 160 are also structured to enable the tabs 160*b* to deflect in direction "A" during motion of the piston rod in direction "A" without contacting retainer base portion 132*a*. In one embodiment, elements of locking member 160 (and particularly tabs 160*b*) are structured so as to minimize the resistance to motion of the piston rod in direction "A" exerted by ends of tabs 160*b*. Locking member 160 may be formed from a metallic material or any other suitably resilient material or materials.

Optimum values of parameters such as the widths w of the tabs 160*b*, the number of tabs, the material thickness, grade and/or temper and other pertinent parameters for a given application may be iteratively determined through analysis and/or testing, using known methods. These parameters may be defined and/or dimensioned so as to achieve a desired balance between the friction force applied by the locking member to the piston rod 124 during extension of the rod, and the locking force applied to the piston rod in response to an applied retraction force (in direction "B"), when tabs 160*b* reside in groove 123*k* as described below.

Generally, the locking member is dimensioned so as to minimize the overall part thickness T2 prior to activation of the hood lifting mechanism, while maintaining functionality. In a particular embodiment, T2 is 1.4 millimeters when the locking member is in an unstressed or unloaded condition.

In the embodiment shown in the drawings, tabs 160*b* have uniform width dimensions w. However, if desired, one or more of the tabs 160*b* may have a width tapering from a relatively greater dimension closer to the outer portion 160*a* to a relatively smaller dimension at the free end of the tab.

A radius may be provided at each intersection of 160*b* with 160*a*, to help minimize stress concentrations. In a particular embodiment, the radius is within the range 0.2 to 0.5 mm.

In a particular embodiment, an included angle α between each side of tabs 160*b* and an adjacent portion of outer portion 160*a* is greater than 90 degrees. Generally, the locking member 160 is dimensioned so as to minimize the outer diameter D2 of outer portion 160*a*. In a particular embodiment, the outer diameter is 21 millimeters.

Generally, the length T3 of each of tabs 160*b* is less than or equal to (T1/2). It has been found that this aids in preventing buckling or other undesirable deflection of portions of the locking member during operation of the hood lifting mechanism. In a particular embodiment, a sum of length T4 of outer portion 160*a* taken along a surface of outer portion 160*a* and length T3 taken along a surface of the tab 160*b* is equal to 5 millimeters.

When the hood lifting mechanism is activated, piston 123 and its associated piston rod 124 are moved in direction "A" by forces exerted on piston 123 by pressurized gases or another suitable mechanism. Because tabs 160*b* extend in the extension direction of the piston rod when the rod is extending, the edges of the tabs in contact with the piston rod slide easily along the surface of the rod when the rod moves in direction "A". When the piston 123 reaches full travel, piston flange 123*c* abuts housing end wall 122*s*, whereby further motion of the piston in direction "A" is prevented. FIG. 7B shows the piston 123 and piston rod 124 in an extended state of the hood lifting mechanism, when the piston 123 has reached the full extent of its travel within the housing 122.

FIG. 7A shows the piston 123 and piston rod 124 in a position before full stroke is reached, and FIG. 7B shows the piston 123 and piston rod 124 at full stroke or travel. Groove 123*k* in piston 123 is dimensioned to permit tabs 160*b* to relax or return to an undeflected state when the groove 123*k* reaches the cavity 132*c* where the retaining member resides. In this condition, as seen in FIG. 7B, because the ends of the tabs 160*b* are no longer deflected by piston rod 124 or flange 123*k*, the ends of the tabs 160*b* can relax into the groove 123*k*. Also, is may be seen that, at this time, flange 123*f* has exited housing 122.

In this condition, because the diameter D of opening 160*c* when the tabs are in an undeflected state is less than the diameter of flange 123*f*, the ends of tabs 160*b* residing in groove 123*k* will act to prevent motion of flange 123*f* back into housing 122 through opening 122*p*. Thus, when the tabs 160*b* are received in the groove 123*k*, the distances from the tabs to a central axis X of the housing 122 is less than a distance from an outer diameter or outermost dimension of the piston rod 24 to the central axis X. The presence of the ends of tabs 160*b* in groove 123*k* thus provides resistance to motion of piston 123 and piston rod 124 in direction "B". In addition, the extension of the ends of tabs 160*b* into groove 123*k* also tends to maintain the piston rod 124 in its fully extended condition from the housing.

In another embodiment similar to that shown in FIGS. 6-8B, the hood-lifting mechanism also incorporates a locking mechanism for impeding motion of the piston rod in a piston rod extension direction (direction "A" in the drawings) opposite the retraction direction. In this embodiment, a piston rod 124' has at least a pair of grooves, with one groove proximate each end of the piston rod as shown in FIGS. 5-5B. A groove 124*y*' is formed in piston rod 124' at or proximate a second end 124*b*' of the piston rod and is structured and positioned such that locking member tabs 160*b*, for example (see FIG. 8), snap into the groove when the piston assembly is at or near its full retraction position. In this embodiment, any attempt to move the piston rod 124' in piston rod extension direction "A" prior to actuator activation will press the locking member 160 against a side of the groove 124*y*', in the same manner in which locking member 160 engages groove 123*k* as previously described. Thus, axial motion of the piston rod 124' (along axis X) prior to actuator activation is prevented, and the piston rod 124' is "locked" in the pre-activation position. This prevents the piston rod from extending from the housing due to, for example, the action of gravity on the piston assembly or an increase in pressure on piston side P1 due to elevated temperatures.

If desired, a wall of piston rod groove 124*y*' closest to the gas generator 14 may include a sloped surface or ramp 124*w*' formed into or along a side thereof. This provides an inclined surface or ramp to assist the locking member 160 in "climbing out" of the groove 124*y*' as the piston rod moves in direction "A" after the hood lifting mechanism is activated. The dimensions of the surface 124*w*' may be adjusted to tailor the amount of force needed to force the locking member along surface 124*w*' and onto the exterior surface of the piston rod. Thus, the piston rod is maintained in the fully retracted condition shown in FIG. 6 until activation of the hood lifter.

Thus, it is seen from the above description and drawings that the hood-lifting mechanism embodiments described herein incorporate an embodiment of an elastically deformable locking member operatively coupled to the housing. This member is structured to slidably engage the outer surface (i.e., to slide along or with respect to the piston assembly outer surface) and also structured to engage the groove so as to impede motion of the piston assembly with respect to the locking member.

Figure 9:
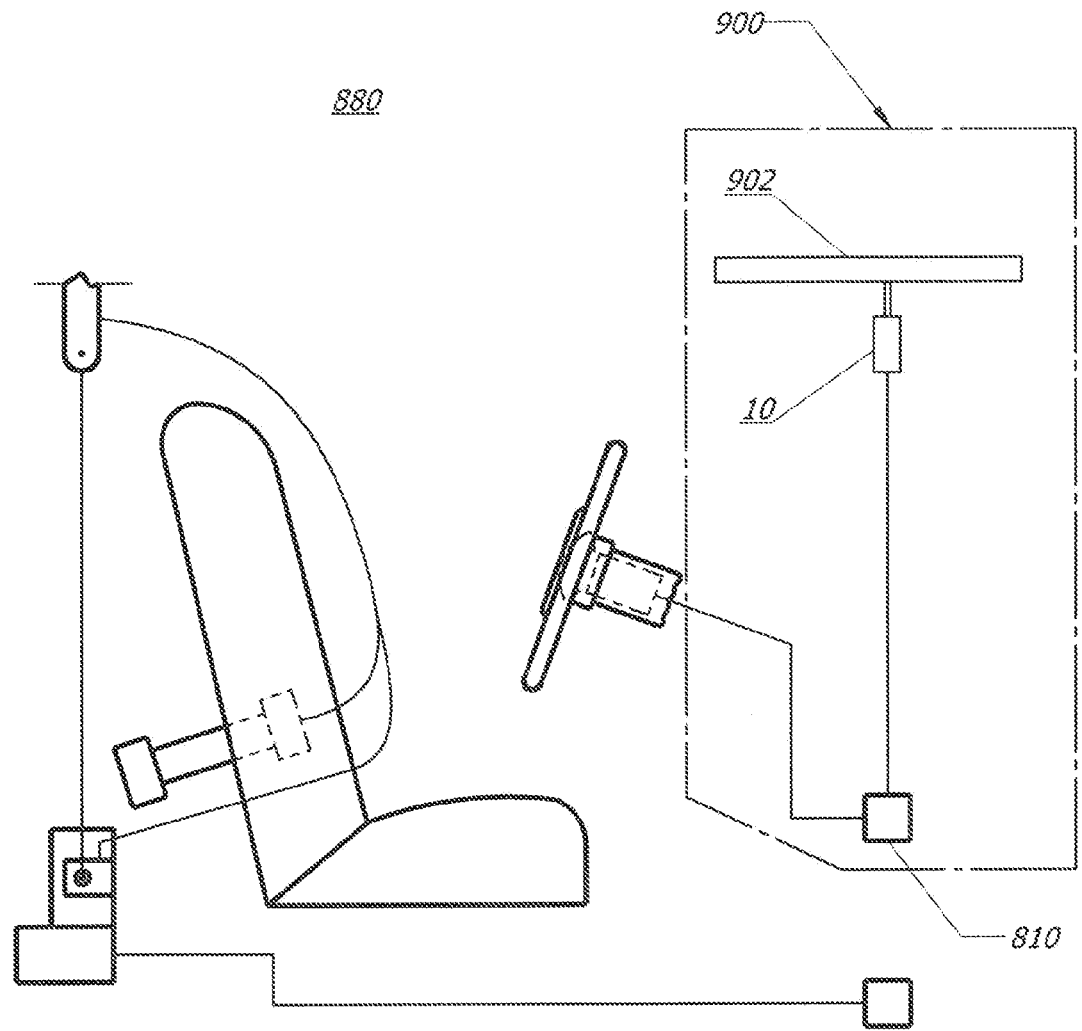
FIG. 9 is a schematic view of a portion of a pedestrian protection system installed in a vehicle and incorporating a hood-lifting device including a locking mechanism in accordance with an embodiment described herein.

FIG. 9 is a schematic view of a portion of a pedestrian protection system 900 installed in a vehicle 880 and incorporating a hood-lifting device 10 including a locking mechanism in accordance with an embodiment described herein. In this embodiment of the pedestrian protection system 900, a vehicle mounted sensor 810 detects contact between the vehicle and a pedestrian (not shown). Responsive to this detected contact, an activation signal is sent to the hood-lifting mechanism 10, resulting in activation of the gas generator or otherwise releasing pressurized gases into the interior of housing 12 to produce extension of the piston rod 50 from the housing, as previously described. The extending piston rod 50 then raises the portion of the hood 902. The hood-lifter activation signal may be sent from the sensor 810 or from a suitably-configured controller (not shown) which receives the vehicle-pedestrian contact signal from sensor 810 and generates the activation signal in response thereto.

It will be understood that the foregoing descriptions of the various embodiments are for illustrative purposes only. As such, the various structural and operational features herein disclosed are susceptible to a number of modifications, none of which departs from the scope of the appended claims.

What is claimed is:

1. A hood lifting mechanism comprising:
a housing containing an exterior defined by an exterior wall, a first end, and a second end;
a piston assembly movably mounted in the housing the piston assembly having a groove formed therealong;
a retainer fixed about the exterior of the housing and to the exterior wall and the second end of the housing, so as to form a cavity between the second end of the housing and the retainer, wherein said exterior wall is distinct from said second end; and
a locking member positioned in the cavity and structured to engage the groove, for preventing motion of the piston assembly with respect to the housing.

2. The mechanism of claim 1 wherein the piston assembly includes a piston and a piston rod operatively coupled to the piston.

3. The mechanism of claim 2 wherein the groove is formed in the piston.

4. The mechanism of claim 2 wherein the groove is formed in the piston rod.

5. The mechanism of claim 4 wherein the groove is formed along a portion of the piston rod residing exterior of the housing when the piston rod is in a fully retracted position in the housing.

6. The mechanism of claim 5 wherein a wall of the groove defines a sloped surface.

7. The mechanism of claim 4 wherein the groove is formed along a portion of the piston rod residing within the housing interior when the piston rod is in a fully retracted position in the housing.

8. The mechanism of claim 2 wherein the groove is formed along the piston.

9. The mechanism of claim 1 wherein the retainer includes a cavity structured for receiving the locking member therein.

10. The mechanism of claim 9 wherein a portion of the housing defines a wall of a cavity in which the locking member is positioned.

11. A vehicle incorporating a hood-lifting mechanism in accordance with claim 1.

12. The mechanism of claim 1 wherein the groove is positioned so as to engage the locking member to prevent motion of the piston assembly in an extension direction of the piston rod.

13. The mechanism of claim 1 wherein the groove is positioned so as to engage the locking member to prevent motion of the piston assembly in a retraction direction of the piston rod.

14. A hood lifting mechanism comprising:
a housing containing an exterior defined by an exterior wall, a first end, and a second end;
a piston assembly movably mounted in the housing so as to be extendible from the housing; and
locking means for engaging the piston assembly exterior of the housing to prevent movement of the piston assembly with respect to the housing, said locking means physically coupled about said exterior at said exterior wall and said second end, wherein said exterior wall is orthogonal to said second end.

15. The mechanism of claim 14 wherein the locking means further comprises a groove formed on the piston assembly and positioned to engage a locking member when the groove is exterior of the housing.

16. A hood lifting mechanism comprising:
a housing containing an exterior defined by an exterior wall, a first end, and a second end;
a piston assembly movably mounted in the housing so as to be extendible from the housing, the piston assembly having an outer surface and a groove extending into a portion of the outer surface;
a retainer coupled to the exterior about the exterior wall and the second end; and
an elastically deformable member contained within the retainer and operatively coupled to the housing, the member being structured to slidably engage the outer surface, and structured to engage the groove so as to impede motion of the piston assembly with respect to the member.

17. The mechanism of claim 16 wherein the member comprises an outer portion and at least one tab extending from the outer portion toward the outer surface.

18. The mechanism of claim 16 wherein the member comprises a ring structured to be radially expandable and contractible responsive to a portion of the piston assembly being engaged by the member.

* * * * *